No. 810,190. PATENTED JAN. 16, 1906.
W. COOPER.
UNION.
APPLICATION FILED MAR. 10, 1905.

WITNESSES.
A. G. Rieczenthowski.
William E. Brown

INVENTOR.
William Cooper
BY Horatio E. Bellows
ATTORNEY.

UNITED STATES PATENT OFFICE.

WILLIAM COOPER, OF PROVIDENCE, RHODE ISLAND.

UNION.

No. 810,190.      Specification of Letters Patent.      Patented Jan. 16, 1906.

Application filed March 10, 1905. Serial No. 249,383.

*To all whom it may concern:*

Be it known that I, WILLIAM COOPER, a citizen of the United States, residing at Providence, in the county of Providence and State of Rhode Island, have invented certain new and useful Improvements in Unions, of which the following is a specification, reference being had therein to the accompanying drawings.

My invention relates to unions or couplings for pipes of all kinds, and has for its objects the ends commonly sought in devices of such a character, but more particularly to secure a perfectly tight connection that will dispense with packing of any kind, to provide a compensation for wear, to minimize dangerous results from accidental abrasion of the coupling-seat by providing a double holding face, bearing, or seat, to provide an accurate and easy means for guiding and centering the parts to be united, and to afford a clear and unobstructed passage for the passage of liquids, fluids, or gases.

To the above ends my invention consists in the novel construction and combination of parts hereinafter set forth, and illustrated in the accompanying drawings, wherein—

Figure 1:
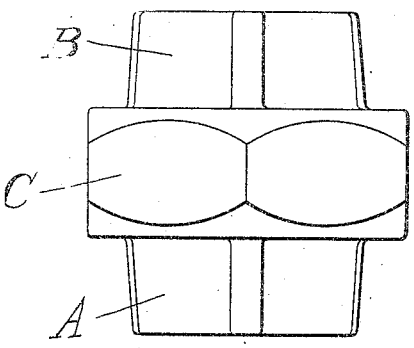
Figure 2:
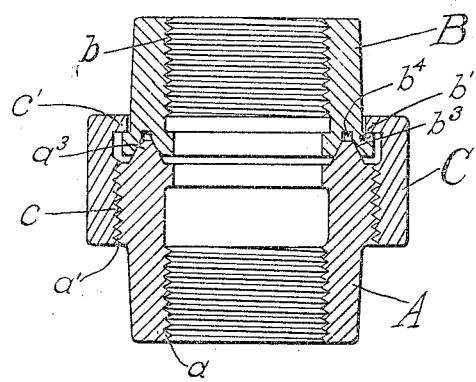
Figure 3:
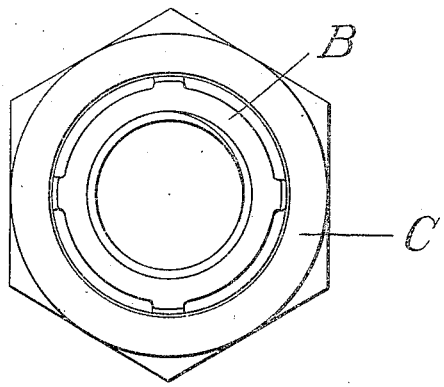
Figure 4:
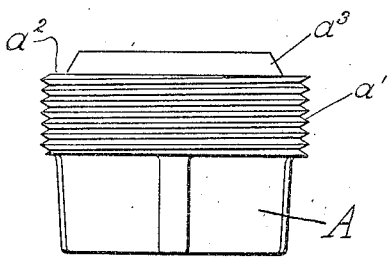
Figure 5:
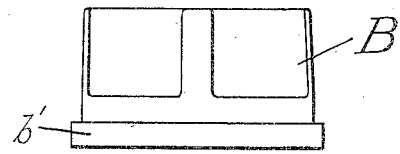

Figure 1 is a side elevation of my novel union complete; Fig. 2, a vertical central section of the same; Fig. 3, a plan view; Fig. 4, a side elevation of the male member disengaged, and Fig. 5 a similar elevation of the disengaged female member.

Like reference characters indicate similar parts throughout the views.

In the drawings, A and B are the male and female pipe members, respectively, and C the coupling nut or collar. The parts may be constructed from malleable iron or other convenient material.

In detail the pipe member A is provided with interior threads $a$ for a distance from its outer extremity. Its opposite exterior portion is of preferably increased diameter and has threads $a'$ upon its periphery. Its inner face or extremity $a^2$ is provided with an annular tapering or beveled rib $a^3$, shaped in cross-section like a truncated letter V.

The female pipe member B is interiorly threaded $b$ and has an external annular shoulder $b'$ upon its side at the inner end. The inner pipe face or extremity has an annular tapering socket or groove $b^3$, in which registers or is seated the annular rib $a^3$. The tapering groove $b^3$ near the point where its sides if extended would converge is extended or deepened to form an annular orifice $b^4$.

The nut C is provided with threads $c$, which engage the threads $a$ of the male member and has an inwardly-projecting flange $c'$, which engages the shoulder $b'$ of the female member.

It will be noted that the double face of the tapering socket affords a double protection in case of partial fracture or an accidental forcing of the pipe parts out of their original alinement, and the annular orifice in conjunction with the tapering form of the socket permits the metal of the rib to flow, lending an elasticity which tightens the shoulder $b'$ against the flange of the collar.

Having described my invention, what I claim as new is—

A union for pipes comprising an exteriorly-threaded male member having an annular, tapered rib on its inner end, a female member having an annular, tapered socket in its inner end and the annular orifice $b^4$, of even width throughout, extending beyond the bottom of the tapered socket and adapted to permit the metal of the rib to flow, and also having an exterior shoulder on the outer wall of said socket, and a collar interiorly threaded to engage the thread of the male member and having an inwardly-extending flange arranged to engage the exterior shoulder of the female member.

In testimony whereof I have affixed my signature in presence of two witnesses.

WILLIAM COOPER.

Witnesses:
    HORATIO E. BELLOWS,
    WILLIAM E. BROWN.